(12) United States Patent
Naylor

(10) Patent No.: US 12,304,542 B2
(45) Date of Patent: May 20, 2025

(54) UNIVERSAL WHEELBARROW SNOWBOARD ATTACHMENT

(71) Applicant: James Laurence Dean Naylor, Sparta, NJ (US)

(72) Inventor: James Laurence Dean Naylor, Sparta, NJ (US)

(73) Assignee: James Lawrence Dean Naylor, Byram, NJ (US)

( * ) Notice: Subject to any disclaimer, the term of this patent is extended or adjusted under 35 U.S.C. 154(b) by 0 days.

(21) Appl. No.: 18/151,428

(22) Filed: Jan. 7, 2023

(65) Prior Publication Data

US 2024/0227908 A1    Jul. 11, 2024

(51) Int. Cl.
*B62B 19/02* (2006.01)
*B62B 1/20* (2006.01)

(52) U.S. Cl.
CPC ............ *B62B 19/02* (2013.01); *B62B 1/20* (2013.01)

(58) Field of Classification Search
CPC .......... B62B 19/02; B62B 19/00; B62B 1/20; B62B 1/18
See application file for complete search history.

(56) References Cited

U.S. PATENT DOCUMENTS

| | | | | |
|---|---|---|---|---|
| 75,812 A * | 3/1868 | Thompson | ............. | B62B 19/02 280/13 |
| 307,591 A * | 11/1884 | Rich | ............. | B62B 19/02 280/23.1 |
| 1,127,762 A * | 2/1915 | Hobbs | ............. | B62B 19/02 280/13 |
| 2,398,142 A * | 4/1946 | Hnat | ............. | B62B 13/18 280/23.1 |
| 3,367,674 A * | 2/1968 | Puhl | ............. | B62B 19/02 280/13 |
| 6,682,082 B1 * | 1/2004 | Dalen | ............. | B62B 19/02 280/10 |
| 6,708,989 B1 * | 3/2004 | Braun | ............. | A63C 17/28 280/8 |
| 8,418,792 B2 * | 4/2013 | Rivard | ............. | B62K 5/01 280/8 |
| 8,851,485 B2 * | 10/2014 | Bach | ............. | B62B 19/02 280/8 |
| 8,950,758 B2 * | 2/2015 | Bysiewicz | ............. | B62B 19/00 280/845 |
| 9,139,216 B1 * | 9/2015 | Rivard | ............. | B62B 13/18 |
| 9,457,831 B2 * | 10/2016 | Rivard | ............. | B62K 5/01 |
| 9,950,732 B1 * | 4/2018 | Patterson | ............. | B62B 19/02 |
| 12,077,207 B2 * | 9/2024 | Moriyama | ............. | F16J 15/3232 |

* cited by examiner

*Primary Examiner* — James M Dolak

(57) ABSTRACT

A devise that makes it possible to use common-or-garden wheelbarrow in snow or other slippery conditions. The device can be used on any standard wheelbarrow and deployed in a matter of a few seconds, without any disassembly or adjustment to the wheelbarrow. The device consists of aplastic board, similar to a children's training snowboard, approximately 104 cm (41 inches) long and 28 cm (11 inches) wide, to which a metal cradle is attached in the center to snugly hold the wheel of the wheelbarrow.

1 Claim, 1 Drawing Sheet

UNIVERSAL WHEELBARROW SNOWBOARD ATTACHMENT

BACKGROUND OF THE INVENTION

My family heats the house with a wood stove. The wood is stored in a shed away from the house and requires the use of a wheelbarrow to transport the wood to the house. When it snows, even as little as 25 mm (1 inch), the wheelbarrow becomes difficult to move when loaded with wood and with snow over 3 inches a wheelbarrow becomes unusable, especially when loaded with 150 pounds of firewood. This problem is experienced by anyone needing to use a wheelbarrow in any slippery condition, such as snow, ice, mud, etc. Homeowners working on their property, DIY enthusiasts, contractors, road workers, farmers, municipal workers, stable owners, and so on face this challenge.

SUMMARY OF THE INVENTION

Apart from solving the problem of not being able to use a wheelbarrow in snowy or other slippery conditions, the objective of this invention was to be able to be used on any wheelbarrow, regardless of the size of the wheel installed on it; to be deployable without any disassembly of the wheelbarrow; deployable and undeployable easily and quickly; light in weight and consisting of low cost manufacturing, thus enabling the unit to sell for less than the cost of the wheelbarrow it is used on.

The design consists of a board, similar to a child's training snowboard. The board is approximately 104 cm (41 inches) long and 28 cm (11 inches) wide. The cradle, that holds the wheel of the wheelbarrow to the board is positioned in the center of the board. The wheelbarrow wheel drops into the cradle and the invention is ready for use.

DETAILED DESCRIPTION OF THE INVENTION

Figure 1:
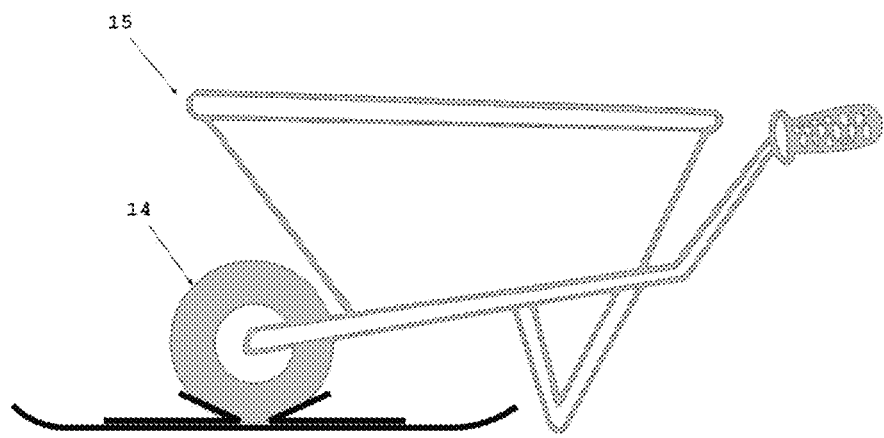
FIG. 1—Profile view of invention installed on a wheelbarrow, Part #15.
Figure 2:
FIG. 2—Profile view of invention. Part #10 is the snowboard. Parts #11A and 11B represent the wheel cradle. They are a mirror image of each other. Part #14 is the tire of the wheelbarrow sitting in the wheel cradle, Part #11a & 11b.
Figure 3:
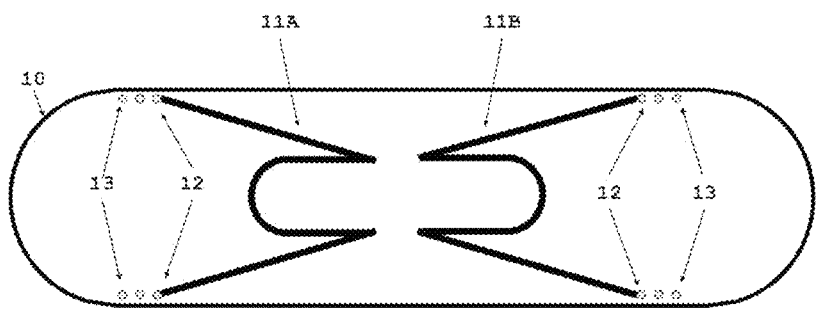
FIG. 3—Plan view of invention. Part #10 is the snowboard. Parts #11A and 11B represent the wheel cradle. They are a mirror image of each other. Part #12 indicates the screw locations holding the cradle arms to part #10, the board. Part #13 is groups of 3 clearance holes either side and each end of part #10, the board. They facilitate the adjustment of the wheel cradle to accommodate the different wheel/tire sizes used by the different wheelbarrows.

The invention consists of seven parts; one snowboard with twelve holes, four countersink screws and the wheel cradle that consists of two unconnected pieces.

Each cradle piece is made from a single 13 mm (½ inch) mild steel bar, bent into shape. The cradle is attached to the board by four cradle arms with 6 mm (¼ inch) threaded holes, 13 mm (½ inch) from the end of each arm. A 6 mm (¼ inch) countersink screws are inserted from the underneath of the board and screw into the threaded holes of the wheel cradle arms.

The first bend in the construction of each the cradle arms is the 9.5 cm (3¾ inch), internal diameter, semicircle in the middle of the bar, that follows the contour of the wheelbarrow's wheel/tire. The two arms are bent up and back at a 25-degree angle 14 cm (5.5 inch), internal length, from the center of the semicircle to the arm bends. The arms are 30 cm (12 inches) long and bent outwards 12 degrees.

The arms of the wheel cradle address a crucial problem using a snowboard with a loaded wheelbarrow, by making the board ridged and preventing it from flexing up either side of the wheelbarrow wheel. If the arms weren't employed the in the board takes on a U shape in the snow when the wheelbarrow is loaded, which causes the board to get stuck.

The board is a low cost 6 mm (¼ inch) plastic snowboard, similar to training boards used by children. Each end has a 24 cm (9½ inch) radius curve upwards, 18 cm (7 inches) long. It has twelve 6 mm (¼ inch) holes (with clearance for the wheel cradle securing screws), six at each end of the board, three either side. The holes use a countersink on the underside of the board to facilitate a flush finish with the countersink screws. The three holes either side facilitates adjustment of the wheel cradle for the differing wheelbarrow wheel sizes.

Assembly consists of pushing the 6 mm (¼ inch) screws through the appropriate holes of the board and screwing them into the threaded holes in wheel cradle arms.

This design of this invention is a significantly different U.S. Pat. No. 3,367,674 A, Wheelbarrow Attachment. My invention is better suited to the various wheel/tire sizes used by wheelbarrows. My invention is much easier to and cheaper to manufacture and consists of less parts. My invention is lighter and thus easier to handle.

U.S. Pat. No. 3,367,674 A uses a ski and not a snowboard. My earlier protypes used a ski which became inoperable when the wheelbarrow was loaded and the snow was deeper than 6 inches as it would sink into the snow.

For additional simplicity of installation of the invention onto the wheelbarrow, the design specifically does not have a front and back, unlick U.S. Pat. No. 3,367,674 A, thus ensuring installation was guaranteed, quick and easy, i.e., there is no wrong way to install it.

The invention claimed is:

1. A snowboard attachment for a wheelbarrow to enable the wheelbarrow to be used in icy and other slippery environmental conditions, especially with snow depth greater than five centimeters/two inches, wherein the snowboard attachment comprises:
    a snowboard; and
    a cradle attached to the snowboard, wherein the cradle holds a tire of the wheelbarrow when attached to the wheelbarrow;
    wherein the cradle comprises:
        two cradle arms each with a semicircle hoop, the semicircle hoops opposing each other, each semicircle hoop having two straight arms leading downwards at an angle toward a center of the snowboard;
        wherein at a point where the two straight arms meet the snowboard, the cradle arms bend in opposite direction of the semicircle hoops toward an end of the snowboard; and
    wherein the snowboard attachment distributes a weight of the wheelbarrow and contents therein, across the entire snowboard and stiffens the snowboard keeping it straight by preventing the snowboard from flexing into a bow or arc.

* * * * *